United States Patent
Fourney

(10) Patent No.: US 9,073,703 B2
(45) Date of Patent: Jul. 7, 2015

(54) APPARATUS AND METHODS FOR DYNAMICALLY CONTROLLING THE SPACING OF CONVEYED OBJECTS

(71) Applicant: Laitram, L.L.C., Harahan, LA (US)

(72) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 71 days.

(21) Appl. No.: 13/897,440

(22) Filed: May 20, 2013

(65) Prior Publication Data

US 2014/0339051 A1 Nov. 20, 2014

(51) Int. Cl.
*B65G 47/26* (2006.01)
*B65G 47/31* (2006.01)

(52) U.S. Cl.
CPC .................................... *B65G 47/31* (2013.01)

(58) Field of Classification Search
CPC ........ B65G 17/42; B65G 19/22; B65G 19/24; B65G 2201/02; B65G 17/38
USPC ............ 198/419.2, 419.3, 726, 727, 731, 817
See application file for complete search history.

(56) References Cited

U.S. PATENT DOCUMENTS

| | | | |
|---|---|---|---|
| 1,478,460 A * | 12/1923 | Stibitz et al. | 198/731 |
| 3,589,502 A * | 6/1971 | Maillet et al. | 198/729 |
| 4,143,759 A | 3/1979 | Paradis | |
| 4,640,408 A | 2/1987 | Eaves | |
| 4,663,042 A * | 5/1987 | Rasper et al. | 198/731 |
| 5,038,919 A | 8/1991 | Harston | |
| 5,238,101 A * | 8/1993 | Ota et al. | 198/626.5 |
| 5,369,942 A | 12/1994 | Olson | |
| 5,852,912 A | 12/1998 | Chalendar | |
| 7,533,768 B2 * | 5/2009 | Floding et al. | 198/419.3 |
| 7,726,461 B2 | 6/2010 | Risley | |
| 7,752,828 B2 * | 7/2010 | Gudim et al. | 198/803.11 |
| 8,113,335 B2 * | 2/2012 | Aronsson et al. | 198/419.3 |
| 8,430,232 B2 | 4/2013 | Baldanza et al. | |
| 2006/0207862 A1 | 9/2006 | Costanzo et al. | |
| 2008/0264757 A1 | 10/2008 | Fourney | |
| 2010/0243407 A1 * | 9/2010 | Anderson et al. | 198/419.2 |
| 2012/0285799 A1 | 11/2012 | Fourney | |

OTHER PUBLICATIONS

International Search Report and Written Opinion of the International Searching Authority, PCT/US2014/037650, mailed Sep. 5, 2014, Korean Intellectual Property Office, Republic of Korea.

* cited by examiner

*Primary Examiner* — James R Bidwell
(74) *Attorney, Agent, or Firm* — Catherine M. Bishop

(57) ABSTRACT

A conveying system employs independently controlled flights. The flights are controlled separately from a conveying surface. The conveying system includes a dynamic gapping conveyor for spacing conveyed objects in a selected manner. The dynamic gapping conveyor uses flexible flights independently driven by drivers to control the spacing between conveyed objects. The independent drivers allow the position of the flights to be controlled based on the length of a conveyed object.

19 Claims, 5 Drawing Sheets

APPARATUS AND METHODS FOR DYNAMICALLY CONTROLLING THE SPACING OF CONVEYED OBJECTS

BACKGROUND OF THE INVENTION

The present invention relates to the field of power-driven conveyors. More particularly, the invention relates to a system and method for controlling the spacing of conveyed objects.

It is often desirable to space conveyed objects in a selected manner along the travel direction of a conveyor belt. The spacing enables downstream processing, such as sorting by diverting of selected objects onto an exit conveyor. For example, it may be desirable to have only one package on a section of a conveying system, such as a diverter, at a time. If the packages are of different sizes, such as often occurs in the shipping industry, then the gap between packages should be varied in order to ensure that only one package is on the selected section at a time, while maintaining the smallest possible gap between packages.

SUMMARY OF THE INVENTION

A conveying system employs flights that are controlled separately from a conveying surface. The conveying system includes a dynamic gapping conveyor for spacing conveyed objects in a selected manner. The dynamic gapping conveyor uses flexible flights independently driven by drivers to control the spacing between conveyed objects.

According to one aspect of the invention, a conveying system comprises a first conveyor operating at a first conveying speed, a second conveyor operating at a second conveying speed greater than the first conveying speed, the second conveyor receiving objects from the first conveyor, and a third conveyor at a discharge end of the second conveyor. The third conveyor operates at a third conveying speed. The third conveyor includes a plurality of flights separated by a variable separation distance.

According to another aspect of the invention, a dynamic gapping conveyor comprises a conveying surface extending in a conveying direction from a first end to a second end and laterally from a first side edge to a second side edge and a flight extending laterally across the conveying surface. The flight has a first end connected to a first driver on a first side of conveying surface, and second end connected to a second driver on a second side of the conveying surface.

According to another aspect of the invention, a dynamic gapping conveyor comprises a conveying surface extending in a conveying direction from a first end to a second end and laterally from a first side edge to a second side edge, a first flight extending laterally across the conveying surface, a first driver connected to the first flight for driving the first flight, a second flight extending laterally across the conveying surface and a second driver connected to the second flight for driving the second flight.

According to still another aspect of the invention, a flight for a conveyor comprises a body extending from a first side to a second side and from a top to a bottom, a first notch spaced from the first side and extending from one of the top and bottom edges to form a first drive tab between the first notch and the first side for connecting to a drive belt, and a second notch spaced from the second side and extending from the one of the top and bottom edges to form a second drive tab between the second notch and the second side for connecting to a drive belt. The space between the first notch and second notch forms an object interface surface that spans a conveying surface of a conveyor.

DETAILED DESCRIPTION OF THE INVENTION

A conveying system includes a dynamic gapping conveyor to dynamically control the spacing between objects being transported through the conveying system. The dynamic gapping conveyor uses flexible flights independently driven by drivers, such as drive belts on either side of the a conveying surface, to control the spacing between conveyed objects. The present invention will be described below relative to certain illustrative embodiments. Those skilled in the art will appreciate that the present invention may be implemented in a number of different applications and embodiments and is not specifically limited in its application to the particular embodiments depicted.

Figure 1:
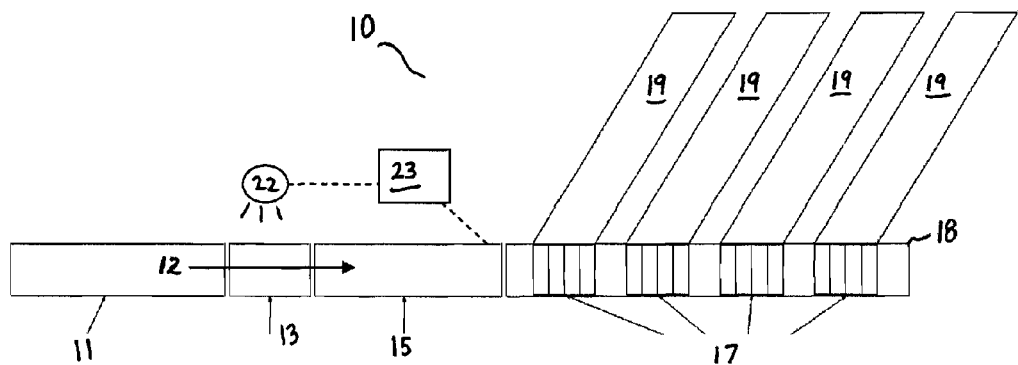
FIG. 1 is a top plan view of a conveying system according to an embodiment of the invention.

FIG. 1 shows a conveying system 10 including a sequence of conveyers for conveying objects, such as packages, in a conveying direction 12. The system includes a meter conveyor 11, a fixed gapping conveyor 13 for receiving objects from the meter conveyor and creating a gap between objects, and a dynamic gapping conveyor 15 for receiving the spaced objects and creating a selected gap between the objects. In the illustrative embodiment, the conveying system 10 also includes a diverting conveyor 18 for selectively diverting objects onto one or more exit conveyors 19. In the illustrative embodiment, the dynamic gapping conveyor 13 creates a specific gap between objects so that only one object is placed on a diverter section 17 at a time, to ensure accurate diversion.

Objects, such as packages to be sorted, may be introduced on the meter conveyer 11 with no gap between them. The meter conveyor conveys objects at a first conveying speed towards the fixed gap conveyor 13. The objects then transition to the fixed gapping conveyer 13 which preferably operates at a higher conveying speed than the meter conveyor 11. The increase in speed produces a small gap between objects as the objects transition onto the fixed gapping conveyor 13. The small gap allows a sensor or sensors 22 to detect and measure the length of each object. The separated objects then transition to the dynamic gapping conveyor 15, which introduces flights between the objects. Based on the measurement provided by the sensor 22 regarding object length, the dynamic gapping conveyor 15, under the control of a control system 23, separates the objects further to create a final gap between each objects. The final gap is selected such that only one object is placed on a diverter section 17 at a time. The conveying speed on the dynamic gapping conveyor 15 is preferably higher than the conveying speed of the fixed gap conveyer 13. The meter conveyor 11, fixed gapping conveyor 13 and dynamic gapping conveyor 15 may comprise any suitable conveyance means, such as a conveyor belt, including a flat belt, modular conveyor belt, chain conveyor belt, and other types of conveyor belts known in the art, a roller conveyor, a slat conveyor, or any other suitable type of conveyor.

Figure 2:
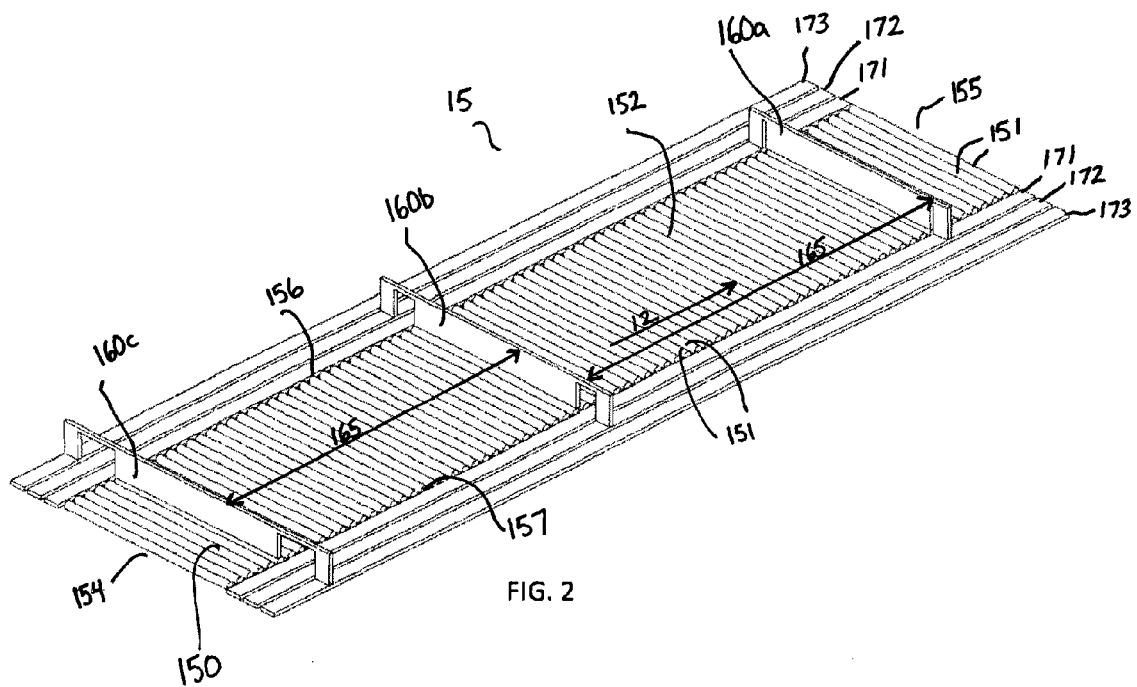
FIG. 2 is an isotropic, schematic view of a dynamic gapping conveyor in the conveying system of FIG. 1.
Figure 3:
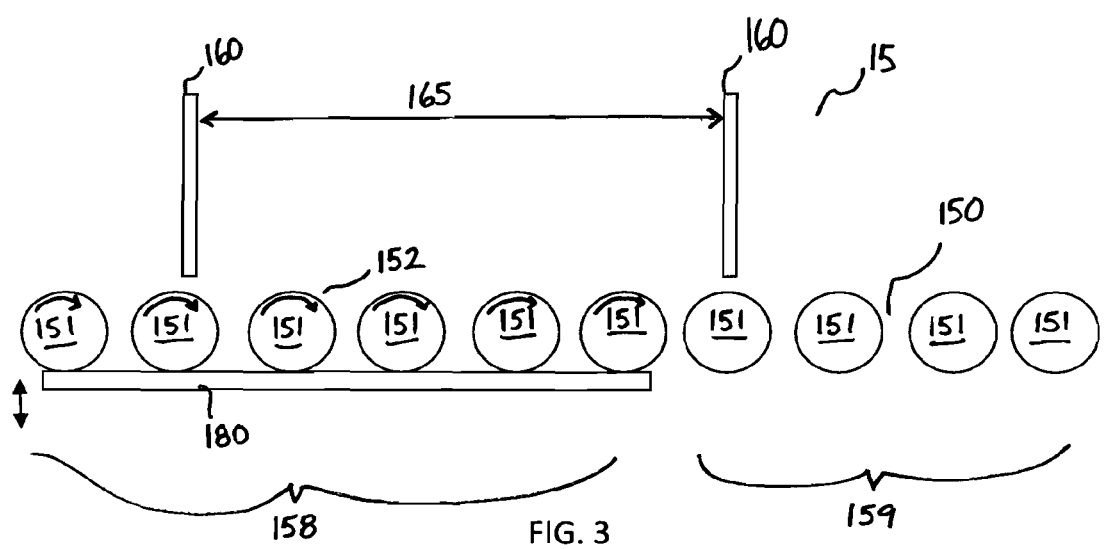
FIG. 3 is a cross sectional side view of the dynamic gapping conveyor of FIG. 2.

FIGS. 2 and 3 illustrate an embodiment of a dynamic gapping conveyor 15 suitable for controlling a gap between conveyed objects. The illustrative dynamic gapping conveyor 15 comprises a conveyor belt 150 trained around sprockets or other drivers and having embedded rollers 151 forming a conveying surface 152. The conveying surface 152 extends longitudinally from a first end 154, which is the receiving end, to a second end 155, which is the discharge end. The conveying surface 152 extends laterally in width from a first side edge 156 to a second side edge 157.

The rollers 151 have axes perpendicular to the direction of travel 12 of the dynamic gapping conveyer. In the illustrative embodiment, the rollers 151 extend laterally across the width of the conveyor belt 150, though the invention encompasses a plurality of rollers across the width of the conveyor belt. In addition, the invention is not limited to a conveyor belt with rollers embedded therein, but may encompass a conveyor comprising powered rollers, rollers connected to chains at each end, or any suitable conveyor known in the art. The invention is also not limited to a conveying surface formed by rollers. For example, the conveying surface may comprise a material that allows objects to slide across the conveying surface to enable adjustment of their position on the conveying surface 152.

The dynamic gapping conveyor 15 includes a plurality of flights 160a-c extending laterally across the width of the conveying surface 152, perpendicular to the conveying direction 12, for guiding conveyed objects. The flights 160 serve as stops to limit the travel of objects, such as packages, to control their relative spacing. Preferably, the flights 160 are sufficiently flexible to fit through the spaces between the different conveyers, and rigid enough to control the motion of objects being conveyed. The flights are adjacent to or sufficiently close to the conveying surface 152 so that objects on the conveying surface 152 abut the flights.

In an illustrative embodiment of the invention, the flights 160 are driven independently from the conveying surface 152 and, in some embodiments, each other. The flights may be separated by a variable separation distance 165, which allows the flights to be used to independently vary object spacing. The position of the flights 160 is longitudinally adjustable relative to the conveying surface 152 and-or each flight 160 may travel at a different speed than the conveying surface 152.

Referring to FIG. 3, the illustrative dynamic gapping conveyor 15 includes an actuation surface 180 below the conveying surface 152 for selectively actuating the rollers 151 in a first section 158 of the conveyor 15. The illustrative actuation surface 180 is a stationary flat surface that may be moved into contact with the underside of selected rollers or remains in constant contact with the selected rollers.

Contact with the actuation surface 180 causes the rollers 151 in the first section 158 to rotate, which gives the top side of the rollers at the conveying surface 152 a velocity equal to twice the speed of the conveyor belt 150. For the second portion 159 of the conveyer 15, the bottom of the rollers is not in contact with anything, allowing the rollers to free wheel, which allows the flights 160 to dictate the speed of the package and thus the gap between conveyed objects.

Other suitable means for activating the rollers in the first section 158 to speed up the conveyance speed relative to the speed of the conveying surface may be used.

Each flight 160 is controlled independently of the conveyor belt 150 to allow dynamic spacing of objects based on a measurement, such as length. For example, each flight may connect to an associated driver for controlling the speed and-or location of the flight. In the illustrative embodiment, as shown in FIG. 2, a first flight 160a is connected to a first flight driver 171, which independently drives the first flight 160a. A second flight 160b is connected to a second flight driver 172, which independently drives the second flight 160b. A third flight 160c is connected to a third flight driver 173, which independently drives the third flight 160c. In the illustrative embodiment, each flight driver comprises a pair of drive belts operating parallel to the conveying surface 152, though other drivers may be used.

Figure 4A:
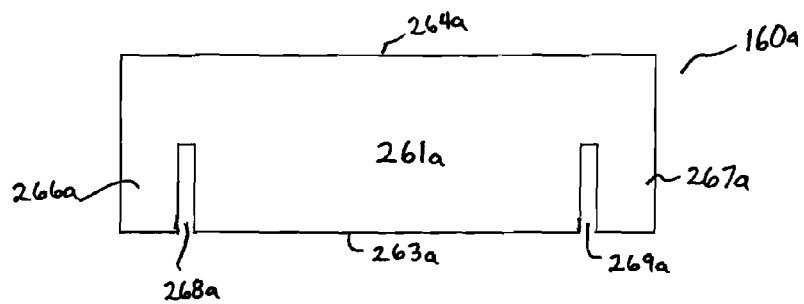
FIG. 4A is a front view of a first flight in the dynamic gapping conveyor of FIG. 2.

As shown in FIG. 2, the first drive belts 171 are adjacent to the side edges 156, 157 of the conveying surface 152. The corresponding flight 160a, shown in FIG. 4A, comprises a central portion 261a spanning the conveying surface 152. The central portion 261a forms an object interface surface. The bottom edge 263a of the central portion 261a is sufficiently close to the conveying surface 152 to stop an object being conveyed. The illustrative central portion is planar and extends from the bottom edge 263a to a top edge 264a, though alternate configuration may be considered. The flight includes drive tabs 266a, 267a separated from the central portion 261a by notches 268a, 269a. Each drive tab 266a, 267a connects to a drive belt 171, as shown in FIG. 2. The pair of drive belts 171 is connected to sprockets, pulleys or other suitable means for driving the drive belts 171 in parallel with the conveying surface 152. The drive belts 171 move the connected flight 160a about a circuit. The drive belts 171 may operate together, to keep the flight 160a transverse to the conveying surface 152, or independently, to angle the flight 160a relative to the conveyor surface 152. The drive belts 171 allow the flight 160a to move longitudinally relative to the conveyor surface at a selected speed. The flight may operate faster, slower, or at the same speed as the conveyor surface 152, or may be selectively stopped or reversed.

Figure 4B:
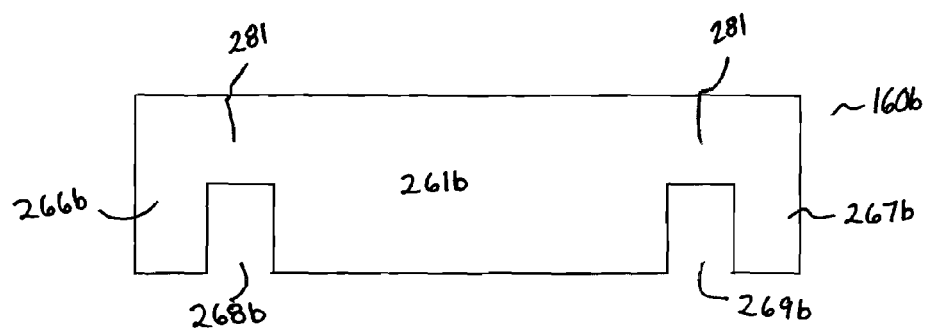
FIG. 4B is a front view of a second flight in the dynamic gapping conveyor of FIG. 2.

A second flights 160b is connected to another independent driver, illustrated as a pair of drive belts 172 adjacent to the first drive belts 171. The second flight 160b, shown in FIG. 4B, includes a central portion 261b that spans the conveying surface 152 and forms an object interface surface. The central portion 261b is substantially identical to the central portion 261a of the first flight 160a. The notches 268b, 269b of the second flight 160b are wider, so that the drive tabs 266b, 267b extend out to the farther drive belts 172. The wider notches 268b, 269b create bridges 281 connecting the drive tabs 266b, 267b to the central portion 261b. The bridges span the first drive belts 171 and allow the drive tabs 266b, 267b to reach the second drive belts 172 without interference.

Figure 4C:
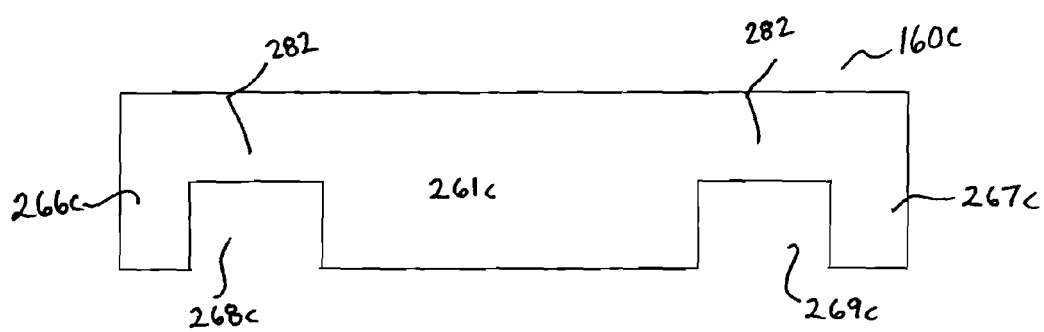
FIG. 4C is a front view of a third flight in the dynamic gapping conveyor of FIG. 2.

A third flight 160c is connected to another independent driver, illustrative as a pair of drive belts 173 adjacent to the second drive belts 172. The third flight 160c, shown in FIG. 4C, includes a central portion 261c that is substantially identical to the central portion of the first and second flights and forms an object interface surface. The notches 268c, 269c of the third flight are wider than the notches of the second flight 160b, to create longer bridges 282 connecting the drive tabs 266c 267c to the central portion 261c. The bridges 282 span the first and second drive belts 171, 172, allowing the drive tabs 266c, 267c to extend farther out and reach the third drive belts 173 without interference.

If the flight is sufficiently rigid, a single drive belt or other suitable driver may be used to independently drive the flight, rather than connecting each end of the flight to a driver. In addition, the flight need not extend across the entire width of the conveying surface, but may rather extend across only a portion of the width.

The flight is not limited to the illustrative configuration, and may have any suitable size, shape or configuration that allows the flight to be driven independently of the associated conveying surface.

Figure 5:
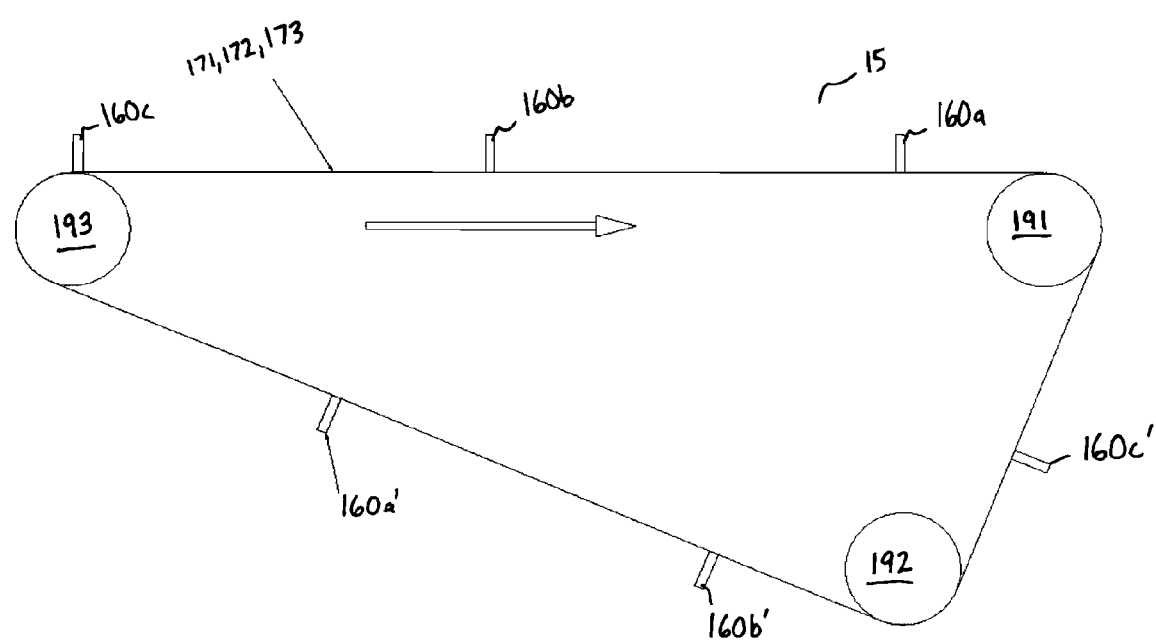
FIG. 5 is a side view of a flight driving mechanism for the dynamic gapping conveyor according to an illustrative embodiment of the invention.

As shown in FIG. 5, each driver 171, 172, 173 may drive a plurality of flights 160. For example, the illustrative dynamic gapping conveyor includes three set of flights, with each set comprising two flights. However, the dynamic gapping conveyor 15 may comprise any suitable number of flights and any suitable number of drivers. Each set of flights is equally spaced around a pair of drive belts 171, 172 or 173, such that only one flight 160a, 160b, 160c from each set is on the conveyer surface at a time. The other flight 160a', 160b', 160c' from each set is disposed in the returnway. Each drive belt 171, 172, 173 is driven independently from the conveyor belt 150 and each other. The drive belts may wrap around the same, aligned, parallel or offset rollers. In the illustrative embodiment, the circuit for each pair of flights and drive belt includes a drive roller 191 at a first end, a guide roller 192 in the returnway and another guide roller 193 at the second end.

While the illustrative dynamic gapping conveyor 15 comprises three aligned drive belts on each side of the conveyor surface, each drive belt can be in any suitable location. For example, the drive belts 171, 172, 173 may be offset from the conveyor surface 152 and-or each other, with the drive tabs 266, 267 extending appropriately.

In another embodiment, one or more drive belts 171, 172, 173 may extend vertically, or be disposed above the conveyor surface 152 to provide a conveyor having independently controlled flights.

Referring back to FIG. 1, the control system 23 determines a desired gap between two conveyed objects based on the diverter length and the length of each object, as measured by the sensor 22. The control system 23 controls the speed and-or position of a flight designated to receive the trailing object to produce the desired gap before the trailing object is discharged from the dynamic gapping conveyor 15.

Figure 6:
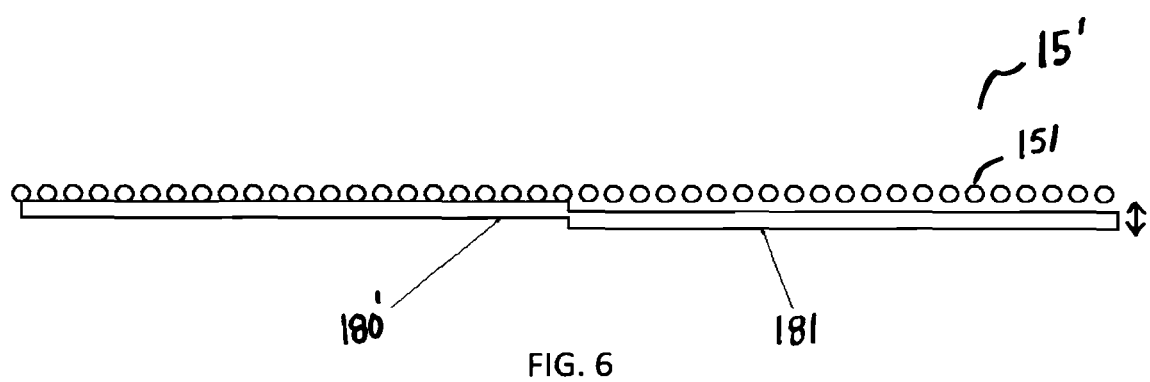
FIG. 6 is a cross-sectional side view of a dynamic gapping conveyor including multiple actuation surfaces according to another embodiment of the invention.

FIG. 6 illustrates an alternate embodiment of a dynamic gapping conveyor 15' in which the actuated section of rollers and-or the unactuated section of rollers are variable. For example, the conveyor may include a first actuation surface 180' in contact with the rollers 151. A second actuation surface 181 may move into and out of contact with the rollers 151 to increase or decrease the number of actuated rollers during conveyance. The use of several independently engageable actuation surfaces allows the dynamic gapping conveyer to vary the distance along which the embedded rollers are in contact with a stationary surface to control the gap between the conveyed objects. A smaller actuated section allows the control system to move the last flight forward sooner, allowing the handling of a variety of objects. The dynamic gapping conveyor may include any suitable number of independent actuation surfaces.

The invention has been described relative to certain illustrative embodiments. Those skilled in the art will appreciate that the present invention may be implemented in a number of different applications and embodiments and is not specifically limited in its application to the particular embodiments depicted.

What is claimed is:

1. A dynamic gapping conveyor, comprising:
  a conveying surface extending in a conveying direction from a first end to a second end and laterally from a first side edge to a second side edge; and
  a flight extending laterally across the conveying surface, the flight having a planar central portion spanning the conveying surface, a first drive tab connected to a first driver on a first side of the conveying surface, a first notch extending up from a bottom edge of the flight to separate the first drive tab from the planar central portion, a second drive tab connected to a second driver on a second side of the conveying surface and a second notch extending up from the bottom edge of the flight to separate the second drive tab from the planar central portion.

2. The dynamic gapping conveyor of claim 1, wherein the flight is flexible.

3. The dynamic gapping conveyor of claim 1, wherein the conveying surface includes rollers.

4. The dynamic gapping conveyor of claim 1, wherein the first driver and second driver are driven together.

5. The dynamic gapping conveyor of claim 1, wherein the first driver and the second driver comprise drive belts.

6. The dynamic gapping conveyor of claim 1, further comprising a second flight extending laterally across the conveying surface, the second flight separated from the first flight by a variable separation distance.

7. The dynamic gapping conveyor of claim 6, wherein the second flight has a first end connected to a third driver on the first side of the conveying surface, and a second end connected to a fourth driver on the second side of the conveying surface.

8. The dynamic gapping conveyor of claim 1, wherein the first driver comprises a first endless belt having an upper span adjacent to a first side edge of the conveying surface.

9. The dynamic gapping conveyor of claim 8, wherein the second driver comprises an endless belt having an upper span adjacent to a second side edge of the conveying surface.

10. The dynamic gapping conveyor of claim 8, wherein the first drive tab extends above the first endless belt and the first notch is above the interface between the first endless belt and the first side edge of the conveying surface.

11. A dynamic gapping conveyor comprising:
  a conveying surface extending in a conveying direction from a first end to a second end and laterally from a first side edge to a second side edge;
  a first flight extending laterally across the conveying surface;
  a first driver connected to the first flight for driving the first flight about a first circuit, the first driver comprising a first drive belt extending along a first side of the conveyor surface in an upper span and returning below the conveyor surface in a returnway;
  a second flight extending laterally across the conveying surface; and
  a second driver connected to the second flight for driving the second flight about a second circuit, the second driver comprising a second drive belt extending along and outward of the first drive belt in an upper span and returning below the conveyor surface in a returnway.

12. The dynamic gapping conveyor of claim 11, wherein the separation distance between the first flight and second flight is variable.

13. The dynamic gapping conveyor of claim 11, wherein the first flight comprises a first planar central portion spanning the conveying surface, a first drive tab connecting the first flight to the first drive belt and a first notch separating the first drive tab from the first planar central portion.

14. The dynamic gapping conveyor of claim 13, wherein the second flight comprises a second planar central portion spanning the conveying surface, a second drive tab connecting the second flight to the second drive belt and a second notch separating the second drive tab from the second planar central portion, wherein the second notch is wider than the first notch.

15. The dynamic gapping conveyor of claim 13, wherein the first notch is above an interface between the first drive belt and the conveying surface.

16. A flight for a conveyor, comprising:
a body extending from a first side to a second side and from a top edge to a bottom edge;
a first notch spaced from the first side and extending from one of the top and bottom edges to form a first drive tab between the first notch and the first side for connecting to a drive belt;
a first endless drive belt connected to the first drive tab on the same top or bottom edge as the first notch;
a second notch spaced from the second side and extending from the one of the top and bottom edges to form a second drive tab between the second notch and the second side for connecting to a drive belt;
a second endless belt connected to the second drive tab on the same top or bottom edge as the second notch,
wherein the space between the first notch and second notch forms an object interface surface that spans a conveying surface of a conveyor.

17. The flight for a conveyor of claim 16, wherein the flight is flexible.

18. The flight of claim 16, wherein the notch is wider than the drive tab.

19. The flight of claim 16, wherein the body of the flight is substantially planar.

\* \* \* \* \*